US012676973B2

(12) United States Patent
Kato et al.

(10) Patent No.: US 12,676,973 B2
(45) Date of Patent: Jul. 7, 2026

(54) IMAGE DECODING DEVICE, IMAGE DECODING METHOD, AND PROGRAM

(71) Applicant: KDDI CORPORATION, Tokyo (JP)

(72) Inventors: Haruhisa Kato, Fujimino (JP);
Yoshitaka Kidani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 255 days.

(21) Appl. No.: 18/594,179

(22) Filed: Mar. 4, 2024

(65) Prior Publication Data

US 2024/0214570 A1 Jun. 27, 2024

Related U.S. Application Data

(63) Continuation of application No. PCT/JP2023/008635, filed on Mar. 7, 2023.

(30) Foreign Application Priority Data

Apr. 12, 2022 (JP) ................................ 2022-065697

(51) Int. Cl.
| | |
|---|---|
| *H04N 19/119* | (2014.01) |
| *H04N 19/157* | (2014.01) |
| *H04N 19/44* | (2014.01) |
| *H04N 19/70* | (2014.01) |

(52) U.S. Cl.
CPC ......... *H04N 19/119* (2014.11); *H04N 19/157* (2014.11); *H04N 19/44* (2014.11); *H04N 19/70* (2014.11)

(58) Field of Classification Search
None
See application file for complete search history.

(56) References Cited

U.S. PATENT DOCUMENTS

| | | | | | |
|---|---|---|---|---|---|
| 9,854,245 | B2 * | 12/2017 | Lee | ...................... | H04N 19/105 |
| 9,930,355 | B2 * | 3/2018 | Sekiguchi | .............. | H04N 19/52 |
| 10,080,023 | B2 * | 9/2018 | Lee | ........................ | H04N 19/18 |
| 11,632,568 | B2 * | 4/2023 | Jang | ...................... | H04N 19/105 375/240.16 |
| 11,683,514 | B2 * | 6/2023 | Gao | ........................ | H04N 19/44 375/240.25 |
| 11,689,731 | B2 * | 6/2023 | Hashimoto | ............ | H04N 19/70 375/240.15 |
| 11,831,920 | B2 * | 11/2023 | Liu | ........................ | H04N 19/46 |
| 12,143,589 | B2 * | 11/2024 | Chen | .................... | H04N 19/543 |
| 12,301,878 | B2 * | 5/2025 | Damghanian | .......... | H04N 19/70 |
| 2021/0337228 | A1 * | 10/2021 | Wang | ................... | H04N 19/436 |
| 2022/0210427 | A1 * | 6/2022 | Chen | .................... | H04N 19/132 |
| 2022/0408082 | A1 | 12/2022 | Bordes et al. | | |
| 2022/0417548 | A1 * | 12/2022 | Xu | ........................ | H04N 19/176 |

(Continued)

FOREIGN PATENT DOCUMENTS

WO WO-2021089455 A1 * 5/2021 ............. H04N 19/70

OTHER PUBLICATIONS

Japanese Office Action dated Mar. 11, 2025, issued in counterpart Japanese Application No. 2022-065697.

(Continued)

*Primary Examiner* — Anand P Bhatnagar
(74) *Attorney, Agent, or Firm* — Holtz, Holtz & Volek PC

(57) ABSTRACT

An image decoding device (200) including a circuit that controls decoding of syntax for controlling a boundary width of a division mode of a sequence to be decoded.

10 Claims, 13 Drawing Sheets

(56) References Cited

U.S. PATENT DOCUMENTS

| | | | | |
|---|---|---|---|---|
| 2023/0421773 A1* | 12/2023 | Chen | ..................... | H04N 19/42 |
| 2024/0275991 A1* | 8/2024 | Chen | ................... | H04N 19/176 |
| 2025/0039388 A1* | 1/2025 | Chen | ..................... | H04N 19/70 |
| 2025/0392734 A1* | 12/2025 | Chen | ................... | H04N 19/176 |

OTHER PUBLICATIONS

Gao, et al., "CE4: CE4-1.7, CE4-1.8: GEO and TPM Blending Off for SCC", Joint Video Experts Team (JVET) of ITU-T SG 16 WP 3 and ISO/IEC JTC 1/SC 29/WG 11; 16th Meeting: Geneva, CH, Oct. 1-11, 2019; Document: JVET-P0069-v2.
International Search Report (ISR) (and English language translation thereof) dated May 23, 2023, issued in International Application No. PCT/JP2023/008635.
"Versatile Video Coding", H266 ITU-T.
Written Opinion dated May 23, 2023, issued in International Application No. PCT/JP2023/008635.
Bross, et al., "Versatile Video Coding Editorial Refinements on Draft 10", JVET-T2001v2.
Chen, "CE4: Summary report on inter prediction with geometric partitioning", JVET-Q0024-v2.
Gao, et al., "CE4-4: Geometric Inter Prediction with Adaptive Blending for SCC", JVET-Q0060_v1.
Gao, et al., "Non-EE2: Adaptive Blending for GPM", JVET-Z0137-v1.
Kidani, et al., "Non-EE2: Adaptive width for GPM blending area", JVET-Z0059-v2.

* cited by examiner

UNIT BLOCK

SMALL
AREA A

SMALL
AREA B

DIVISION BOUNDARY

FIG. 3
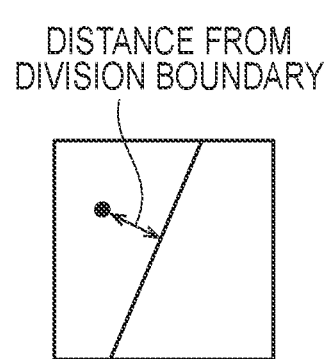
DISTANCE FROM
DIVISION BOUNDARY
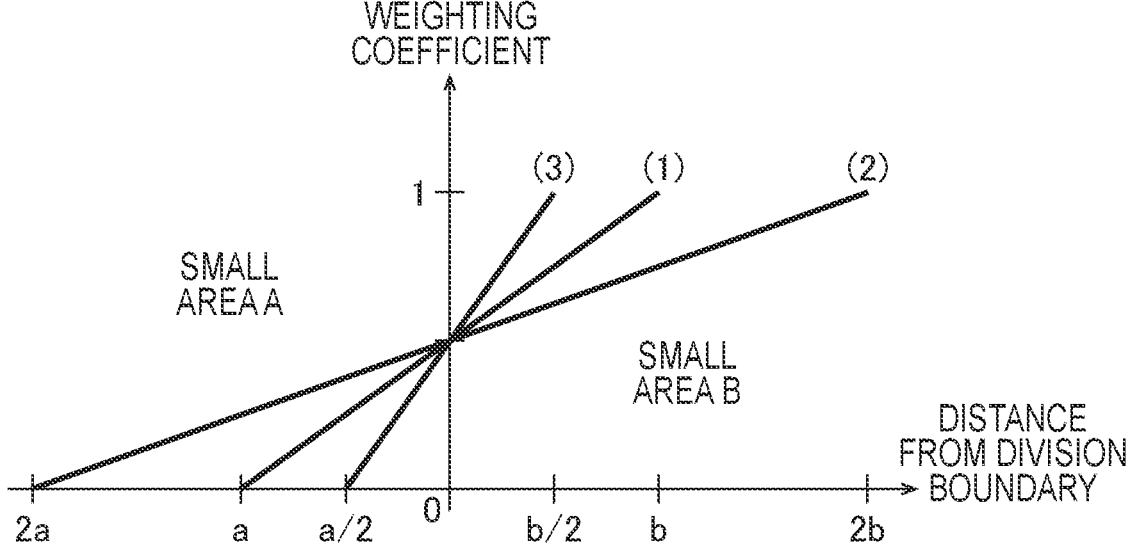

| 8 | 8 | 7 | 6 | 4 | 4 | 2 | 1 |
|---|---|---|---|---|---|---|---|
| 8 | 8 | 7 | 6 | 4 | 4 | 2 | 1 |
| 8 | 8 | 7 | 5 | 4 | 3 | 1 | 0 |
| 8 | 8 | 7 | 5 | 4 | 3 | 1 | 0 |
| 8 | 7 | 6 | 4 | 4 | 2 | 1 | 0 |
| 8 | 7 | 6 | 4 | 4 | 2 | 1 | 0 |
| 8 | 7 | 5 | 4 | 3 | 1 | 0 | 0 |
| 8 | 7 | 5 | 4 | 3 | 1 | 0 | 0 |

WEIGHTING COEFFICIENT w

| 8 | 8 | 8 | 7 | 5 | 3 | 1 | 0 |
|---|---|---|---|---|---|---|---|
| 8 | 8 | 8 | 7 | 5 | 3 | 1 | 0 |
| 8 | 8 | 8 | 6 | 4 | 2 | 0 | 0 |
| 8 | 8 | 8 | 6 | 4 | 2 | 0 | 0 |
| 8 | 8 | 7 | 5 | 3 | 1 | 0 | 0 |
| 8 | 8 | 7 | 5 | 3 | 1 | 0 | 0 |
| 8 | 8 | 6 | 4 | 2 | 0 | 0 | 0 |
| 8 | 8 | 6 | 4 | 2 | 0 | 0 | 0 |

WEIGHTING COEFFICIENT w

| 8 | 8 | 8 | 8 | 6 | 2 | 0 | 0 |
|---|---|---|---|---|---|---|---|
| 8 | 8 | 8 | 8 | 6 | 2 | 0 | 0 |
| 8 | 8 | 8 | 7 | 4 | 1 | 0 | 0 |
| 8 | 8 | 8 | 7 | 4 | 1 | 0 | 0 |
| 8 | 8 | 8 | 6 | 2 | 0 | 0 | 0 |
| 8 | 8 | 8 | 6 | 2 | 0 | 0 | 0 |
| 8 | 8 | 7 | 4 | 1 | 0 | 0 | 0 |
| 8 | 8 | 7 | 4 | 1 | 0 | 0 | 0 |

WEIGHTING COEFFICIENT w

FIG. 7

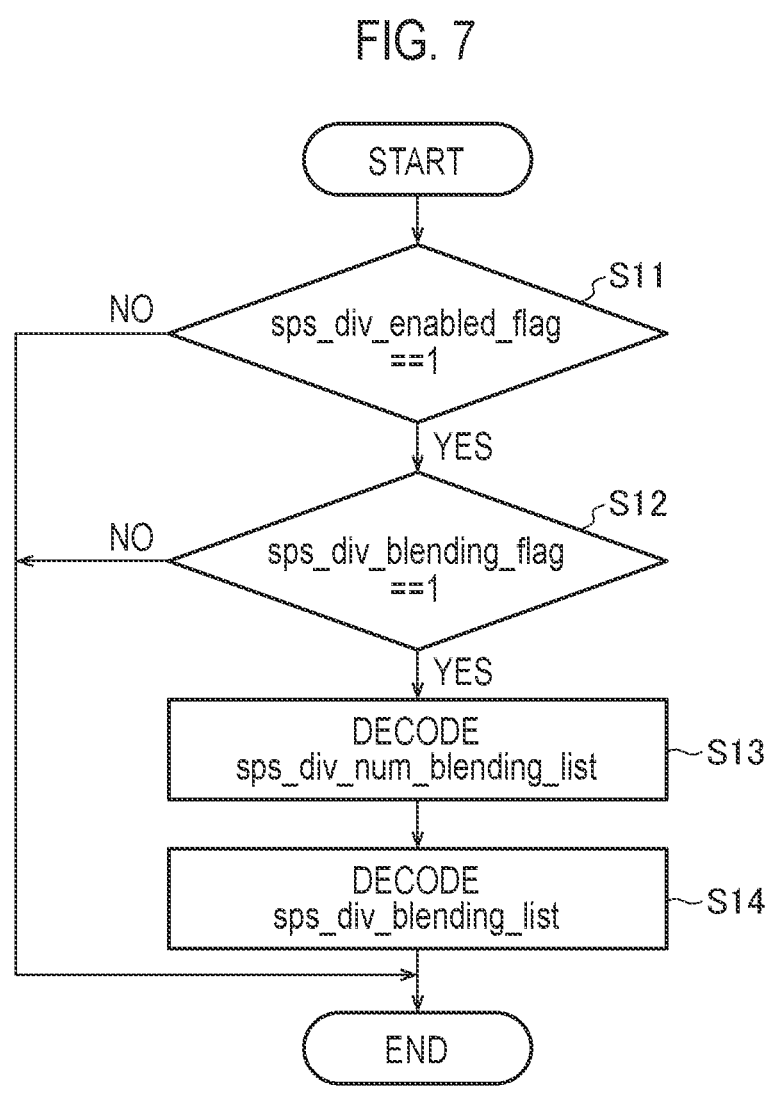

```
                    ┌──────────┐
                    │  START   │
                    └────┬─────┘
                         │
                         ▼
         NO      ◇────────────────◇   ⌒S11
        ◄────────   sps_div_enabled_flag
        │        ◇        ==1       ◇
        │         ◇────────────────◇
        │                 │ YES
        │                 ▼
        │ NO     ◇────────────────◇   ⌒S12
        ◄────────   sps_div_blending_flag
        │        ◇        ==1       ◇
        │         ◇────────────────◇
        │                 │ YES
        │                 ▼
        │        ┌────────────────────────┐
        │        │        DECODE          │  ⌒S13
        │        │  sps_div_num_blending_list │
        │        └───────────┬────────────┘
        │                    │
        │                    ▼
        │        ┌────────────────────────┐
        │        │        DECODE          │  ⌒S14
        │        │   sps_div_blending_list  │
        │        └───────────┬────────────┘
        │                    │
        └────────────────────┤
                             ▼
                    ┌──────────┐
                    │   END    │
                    └──────────┘
```

$$
\gamma_{x_c, y_c} = \begin{cases} 0 & d\left(x_c, y_c\right) \leqslant -\tau \\ \dfrac{1}{2\tau}\left(d\left(x_c, y_c\right) + \tau\right) & -\tau < d\left(x_c, y_c\right) < \tau \\ 1 & d\left(x_c, y_c\right) \geqslant \tau, \end{cases}
$$

IMAGE DECODING DEVICE, IMAGE DECODING METHOD, AND PROGRAM

CROSS-REFERENCE TO RELATED APPLICATIONS

The present application is a continuation of PCT Application No. PCT/JP2023/008635, filed on Mar. 7, 2023, which claims the benefit of Japanese patent application No. 2022-065697 filed on Apr. 12, 2022, the entire contents of which are incorporated herein by reference in its entirety.

TECHNICAL FIELD

The present invention relates to an image decoding device, an image decoding method, and a program.

BACKGROUND ART

Non Patent Literature 1 and Non Patent Literature 2 disclose a geometric partitioning mode (GPM).

The GPM is a mode in which a rectangular block is obliquely divided into two areas and each area is subjected to motion compensation processing. Specifically, the divided two areas are subjected to motion compensation processing using merge vectors, are subjected to weighted averaging processing, and are thus blended.

CITATION LIST

Non Patent Literature

Non Patent Literature 1: ITU-T H. 266 VVC
Non Patent Literature 2: CE4: Summary report on inter prediction with geometric partitioning, JVET-Q0024

SUMMARY OF THE INVENTION

However, in the techniques disclosed Non Patent Literature 1 and Non Patent Literature 2, a weighted averaging pattern is limited, and hence there has been a problem that there is room for improvement in encoding performance.

Thus, the present invention has been made in view of the above-described problem, and an object of the present invention is to provide an image decoding device, an image decoding method, and a program capable of further improving encoding efficiency in GPM.

The first aspect of the present invention is summarized as an image decoding device including a circuit that controls decoding of syntax for controlling a boundary width of a division mode of a sequence to be decoded.

The second aspect of the present invention is summarized as an image decoding method including: controlling decoding of syntax for controlling a boundary width of a division mode of a sequence to be decoded.

The third aspect of the present invention is summarized as a program stored on a non-transitory computer-readable medium for causing a computer to function as an image decoding device, wherein the image decoding device includes a circuit that controls decoding of syntax for controlling a boundary width of a division mode of a sequence to be decoded.

According to the present invention, it is possible to provide an image decoding device, an image decoding method, and a program capable of further improving encoding efficiency in GPM.

BRIEF DESCRIPTION OF THE DRAWINGS

FIG. 3 is a diagram illustrating an example of three patterns of weighting coefficients allocated to the division boundary of the small area B illustrated in FIG. 2.

FIG. 4 is a diagram illustrating an example in which weighting coefficients w of a pattern (2) are applied to an 8×8 block.

FIG. 5 is a diagram illustrating an example in which weighting coefficients w of a pattern (1) are applied to an 8×8 block.

FIG. 6 is a diagram illustrating an example in which weighting coefficients w of a pattern (3) are applied to an 8×8 block.

FIG. 7 is a flowchart illustrating an example of a method for decoding control information by a decoding unit 201.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
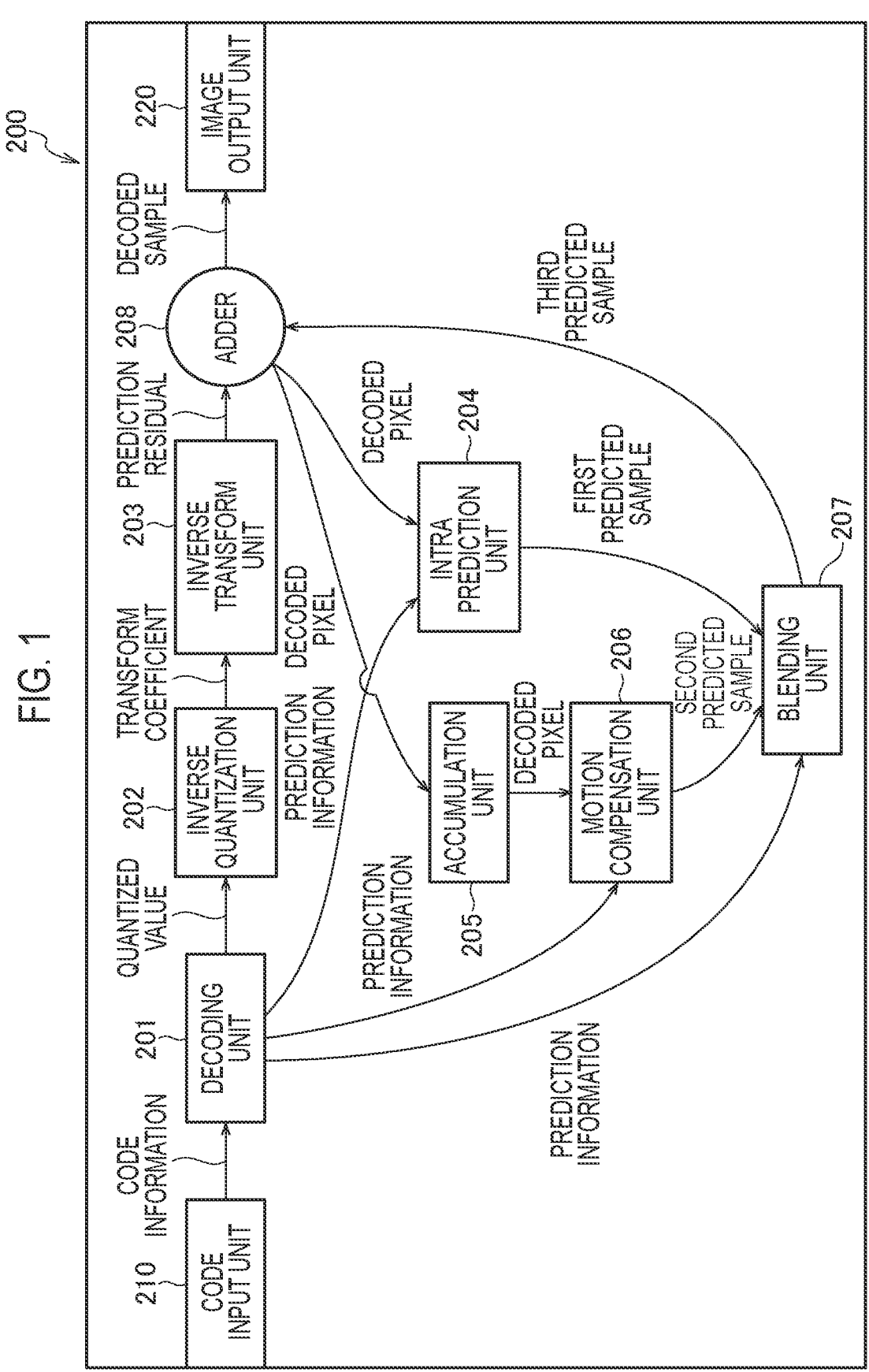
FIG. 1 is a diagram illustrating an example of functional blocks of an image decoding device 200 according to an embodiment.

Hereinbelow, an image decoding device 200 according to a first embodiment of the present invention is described with reference to FIGS. 1 to 8. FIG. 1 is a diagram illustrating an example of functional blocks of the image decoding device 200 according to the present embodiment.

As illustrated in FIG. 1, an image decoding device 200 includes a code input unit 210, a decoding unit 201, an inverse quantization unit 202, an inverse transform unit 203, an intra prediction unit 204, an accumulation unit 205, a motion compensation unit 206, a blending unit 207, an adder 208, and an image output unit 220.

The code input unit 210 is configured to acquire encoded information which is encoded by an image encoding device.

The decoding unit 201 is configured to control decoding of syntax for controlling a boundary width of a division mode of a sequence to be decoded.

Here, the syntax for controlling the boundary width of the division mode of the sequence to be decoded indicates sps_div_blending_flag, sps_div_num_blending_list, sps_div_blending_list, pps_div_blending_flag, pps_div_num_blending_list, pps_div_blending_list, sh_div_blending_flag, sh_div_num_blending_list, sh_div_blending_list, and the like, which will be described later.

To be specific, the decoding unit 201 is configured to decode control information and a quantized value from the encoded information which is input from the code input unit 210. For example, the decoding unit 201 is configured to output control information and a quantized value by performing variable length decoding on the encoded information.

Here, the quantized value is transmitted to the inverse quantization unit 202, and the control information is transmitted to the motion compensation unit 206, the intra prediction unit 204, and the blending unit 207. Note that the control information includes information required for control of the motion compensation unit 206, the intra prediction unit 204, the blending unit 207, and the like, and may include header information such as a sequence parameter set, a picture parameter set, a picture header, or a slice header.

The inverse quantization unit 202 is configured to obtain a decoded transform coefficient by performing inverse quantization on the quantized value transmitted from the decoding unit 201. The transform coefficient is transmitted to the inverse transform unit 203.

The inverse transform unit 203 is configured to obtain a decoded prediction residual by performing inverse transform on the transform coefficient transmitted from the inverse quantization unit 202. The prediction residual is transmitted to the adder 208.

The intra prediction unit 204 is configured to generate a first predicted sample based on a decoded sample and the control information transmitted from the decoding unit 201. Here, the decoded sample is obtained via the adder 208, and is accumulated in the accumulation unit 205. Further, the first predicted sample is a predicted sample as an approximate value of an input sample in a small area which is set by the blending unit 207. Note that the first predicted sample is transmitted to the blending unit 207.

The accumulation unit 205 is configured to cumulatively accumulate the decoded samples transmitted from the adder 208. The decoded sample is referred to from the motion compensation unit 206 via the accumulation unit 205.

The motion compensation unit 206 is configured to generate a second predicted sample based on the decoded samples which are accumulated in the accumulation unit 205 and the control information which is transmitted from decoding unit 201. Here, the second predicted sample is a predicted sample as an approximate value of an input sample in a small area which is set by the blending unit 207. Note that the second predicted sample is transmitted to the blending unit 207.

The adder 208 is configured to obtain a decoded sample by adding the prediction residual transmitted from the inverse transform unit 203 and a third predicted sample transmitted from the blending unit 207. The decoded sample is transmitted to the image output unit 220, the accumulation unit 205, and the intra prediction unit 204.

The blending unit 207 is configured to generate a third predicted sample by preparing a plurality of weighting coefficients by which a width of a division boundary is different for at least one of the first predicted sample transmitted from the intra prediction unit 204 or the second predicted sample transmitted from the motion compensation unit 206 and controlling the width of the division boundary by weighted averaging.

A role of the blending unit 207 is to, in order to compensate for a decoding target block with high accuracy in the adder 208 in a subsequent stage, select weighting coefficients for a plurality of predicted samples that are most suitable for the decoding target block and blend the plurality of input predicted samples according to the weighting coefficients.

Any division mode can be used as long as the decoding target block is divided into a plurality of small areas in the division mode. In the following description, a case of using a geometric partitioning mode (GPM) disclosed in Non Patent Literature 1 and Non Patent Literature 2 as an example of the division mode will be described.

For the weighting coefficients, a plurality of patterns in which arbitrary values are set in advance for each sample of the unit block are prepared, and any one of the patterns is applied. That is, the blending unit 207 may be configured to select and apply one of a plurality of weighting coefficients.

A total value of the weighting coefficients for the plurality of predicted samples is designed to be 1 for each sample, and a result obtained by blending the plurality of predicted samples by weighted averaging using the weighting coefficients is set as a predicted sample by the blending unit 207.

The sample having the weighting coefficient of 1 (that is, the maximum value) is adopted as the input predicted sample, and the sample having the weighting coefficient of 0 (that is, the minimum value) is not used as the input predicted sample. Thus, conceptually, this operation corresponds to dividing a unit block into a plurality of small areas, and determines which sample of the plurality of input predicted samples is applied at which ratio and where.

Here, distribution of the weighting coefficients can be expressed by a smaller unit block when the distribution is a rectangular shape distribution such as a bisector. Thus, it is desirable to distribute the weighting coefficients in a non-rectangular shape.

Figure 2:
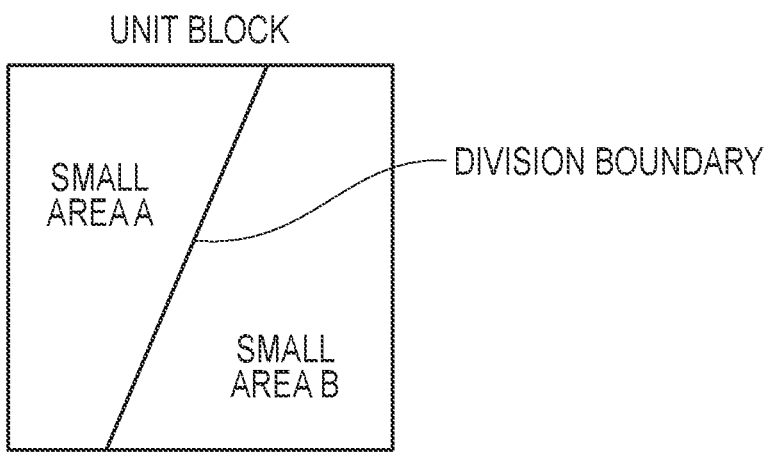
FIG. 2 is a diagram illustrating an example of a case where a rectangular unit block is divided into two areas of a small area A and a small area B by a division boundary.

In the example of FIG. 2, an example of a case where the unit blocks are distributed in an oblique shape is illustrated. In the example of FIG. 2, a rectangular unit block is divided into two areas of a small area A and a small area B by a division boundary.

In each of the small areas A and B, a predicted sample is generated by an arbitrary method such as intra prediction or motion compensation.

At this time, even in a case where the division shape is determined, when the weighting coefficient near the division boundary is determined, it is not possible to express a diversity of the division boundary. As a result, there is a problem that the encoding efficiency cannot be improved.

For example, in a case where the small area is an area in which vigorous movement is present, blurring occurs when imaging. Thus, it is desirable to blur a plurality of small areas over a wide area and perform weighted averaging on the division boundary.

On the other hand, in a case where the small area is an artificially edited area such as a caption, blurring does not occur. Thus, it is desirable to perform weighted averaging such that the division boundary is limited to a narrow area and only a plurality of small areas is adjacent to each other.

In order to solve this problem, in the present embodiment, a procedure of preparing and selecting a plurality of weighting coefficients by which a width of the division boundary of the small areas is different is taken.

FIG. 3 illustrates an example of three patterns of weighting coefficients allocated to the division boundary of the small area B illustrated in FIG. 2. In FIG. 3, a horizontal axis represents a distance in units of samples from a position of the division boundary, and a vertical axis represents the weighting coefficient.

Specifically, there are prepared a pattern (1) in which a weighting coefficient [0, 1] is allocated to a range of [a, b] for the distances a and b in units of samples from a position of the division boundary which is set in advance, a pattern (2) in which a weighting coefficient [0, 1] is similarly allocated to a range of [2a, 2b] obtained by respectively doubling the distances a and b, and a pattern (3) in which a weighting coefficient [0, 1] is similarly allocated to a range of [a/2, b/2] obtained by respectively multiplying the distances a and b by ½.

Figure 13:
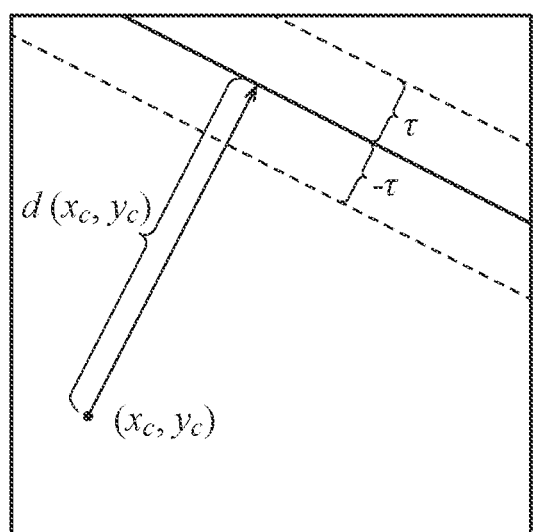
FIG. 13 is a diagram for explaining an example in which weighting coefficients are defined based on a distance from a division boundary.

As illustrated in FIG. 13, in a case where the weighting coefficient is defined as $\gamma_{xc,yc}$ which is uniquely determined by a distance d (xc, yc) from the division boundary (a black solid line), preparing the patterns is equivalent to preparing a plurality of patterns (variable values), instead of a limited pattern (fixed value), for the width of the division boundary of the small areas in FIG. 13, that is, the width τ when the weighting coefficient has a value other than a minimum value or a maximum value. Here, xc, yc is a coordinate in the decoding target block.

That is, the blending unit 207 may be configured to set a plurality of weighting coefficients according to the inter-sample distance from the division boundary.

Note that, when a=b, symmetrical weighting coefficients with respect to the division boundary may be set. That is, the blending unit 207 may be configured to set, as the weighting coefficients, symmetrical weighting coefficients with respect to the division boundary.

In addition, when a≠b, asymmetrical weighting coefficients with respect to the division boundary may be set. That is, the blending unit 207 may be configured to set, as the weighting coefficients, asymmetrical weighting coefficients with respect to the division boundary.

In addition, the number is not limited to the two of a and b, and the weighting coefficients can be set using a plurality of line segments or the like by increasing the number. That is, the blending unit 207 may be configured to set the weighting coefficients using a plurality of line segments according to the inter-sample distance from the division boundary.

FIG. 4 to FIG. 6 illustrate an example in which each weighting coefficient w is applied to an 8×8 block. The weighting coefficient w in FIG. 4 to FIG. 6 takes a value of 0 to 8, and is blended by the following expression.

$$(w \times \text{small area } A + (8-w) \times \text{small area } B + 4) >> 3$$

As described above, by setting the plurality of weighting coefficients w according to the inter-sample distance from the division boundary, an effect that can be uniformly derived even in various block sizes such as 8×8 and 64×16 can be obtained. The type, the shape, and the number of patterns can be arbitrarily set. For example, in the above description, two times and ½ times the distances a and b have been described as the plurality of patterns. On the other hand, four times and ¼ times the distances may be used. Further, in the above expression, the weighting coefficient is set to a value of 0 to 8. On the other hand, the weighting coefficient may be set to another value such as a value of 0 to 16 or a value of 0 to 32. In particular, in a case where the inter-sample distance from the division boundary is twice or four times, weighted averaging in units of samples can be performed with high accuracy by increasing the maximum value of the weighting coefficient.

An example of control information decoding processing by the decoding unit 201 will be described below.

Code information input to the decoding unit 201 can include a sequence parameter set (SPS) in which sets of control information in units of sequences are collected.

In addition, the code information input to the decoding unit 201 can include a picture parameter set (PPS) or a picture header (PH) in which sets of control information in units of pictures are collected.

Further, the code information input to the decoding unit 201 may include a slice header (SH) in which sets of control information in units of slices are collected.

Here, a method in which the decoding unit 201 sets the boundary width in units of sequences will be described with reference to FIG. 7.

As illustrated in FIG. 7, in step S11, the decoding unit 201 determines whether or not sps_div_enabled_flag is 1 in the sequence parameter set. When Yes, the process proceeds to Step S12, and when No, the process ends.

Here, sps_div_enabled_flag is syntax for controlling whether or not GPM is present. When sps_div_enabled_flag is 1, it indicates that GPM is enabled, and when sps_div_enabled_flag is 0, it indicates that GPM is disabled.

In Step S12, the decoding unit 201 decodes sps_div_blending_flag.

Here, sps_div_blending_flag is syntax for controlling whether or not the boundary width is changed. When sps_div_blending_flag is 1, it indicates that the change of the boundary width is enabled, and when sps_div_blending_flag is 0, it indicates that the change of the boundary width is disabled.

Subsequently, the decoding unit 201 determines whether or not sps_div_blending_flag is 1. When Yes, the process proceeds to Step S13, and when No, the process ends.

In Step S13, the decoding unit 201 decodes sps_div_num_blending_list.

Here, sps_div_num_blending_list is syntax for controlling the number of patterns of the boundary width.

In Step S14, the decoding unit 201 decodes sps_div_blending_list representing patterns of the boundary width by the number set in sps_div_num_blending_list.

In the example of FIG. 3, 3 is set in sps_div_num_blending_list, and weighting factors corresponding to the patterns (1) to (3) as sps_div_blending_list are used as options of the boundary width.

In this way, by using sps_div_num_blending_list and sps_div_blending_list, the setting of the number of patterns and the pattern type of the boundary width according to image characteristics can be changed in units of sequences, so that an effect of maximizing encoding efficiency can be expected.

For example, as in the example illustrated in FIG. 3, multiple patterns (1) to (3) can be set for a sequence including a natural image captured by a camera, and one type of pattern and a pattern having a short boundary width can be set for a sequence including a screen image such as a computer screen or a game screen in which a pattern having a small distribution of weighting factors is effective, so that encoding efficiency can be maximized.

In a case where the boundary width is set in units of pictures, the decoding unit 201 decodes, by pps or ph, pps_div_enabled_flag instead of sps_div_enabled_flag, decodes pps_div_blending_flag instead of sps_div_blending_flag, decodes pps_div_num_blending_list instead of sps_div_num_blending_list, and decodes pps_div_blending_list instead of sps_div_blending_list.

In this way, by using pps_div_num_blending_list and pps_div_blending_list, the setting of the number of patterns and the pattern type of the boundary width according to image characteristics can be changed in units of pictures, so that an effect of maximizing encoding efficiency can be expected.

For example, as in the example illustrated in FIG. 3, multiple patterns (1) to (3) can be set for a picture including a natural image captured by a camera, and one type of pattern and a pattern having a short boundary width can be set for a picture including a screen image such as a computer screen or a game screen in which a pattern having a small distribution of weighting factors is effective, so that encoding efficiency can be maximized.

In a case where the boundary width is set in units of slices, the decoding unit 201 decodes, by sh, sh_div_enabled_flag instead of sps_div_enabled_flag, decodes sh_div_blending_flag instead of sps_div_blending_flag, decodes sh_div_num_blending_list instead of sps_div_num_blending_list, and decodes sh_div_blending_list instead of sps_div_blending_list.

In this way, by using sh_div_num_blending_list and sh_div_blending_list, the setting of the number of patterns and the pattern type of the boundary width according to image characteristics can be changed in units of slices, so that an effect of maximizing encoding efficiency can be expected.

For example, as in the example illustrated in FIG. 3, multiple patterns (1) to (3) can be set for a slice area including a natural image captured by a camera, and one type of pattern and a pattern having a short boundary width can be set for a slice area including a screen image such as a computer screen or a game screen in which a pattern having a small distribution of weighting factors is effective, so that encoding efficiency can be maximized.

An increase in the amount of codes can be suppressed by performing setting only in an upper layer, and adaptive control can be performed by performing setting also in a lower layer and prioritizing the setting in the lower layer.

Alternatively, in a case where the pattern of the width of the divided boundary is set in advance, the decoding unit 201 can omit decoding of the pattern of the divided boundary width.

Note that, in the above example, the method of setting the number of patterns and the pattern type of the weighting factors in units of sequences, pictures, or slices has been described. However, the pattern may be directly selected in units of blocks to be described later without setting these. In this case, the degree of freedom in setting the number of patterns and the pattern type of the weighting factors decreases, but an increase in the header information described above can be avoided.

Hereinafter, an example of processing of setting the weighting coefficients by the blending unit 207 will be described with reference to FIG. 8.

Figure 8:
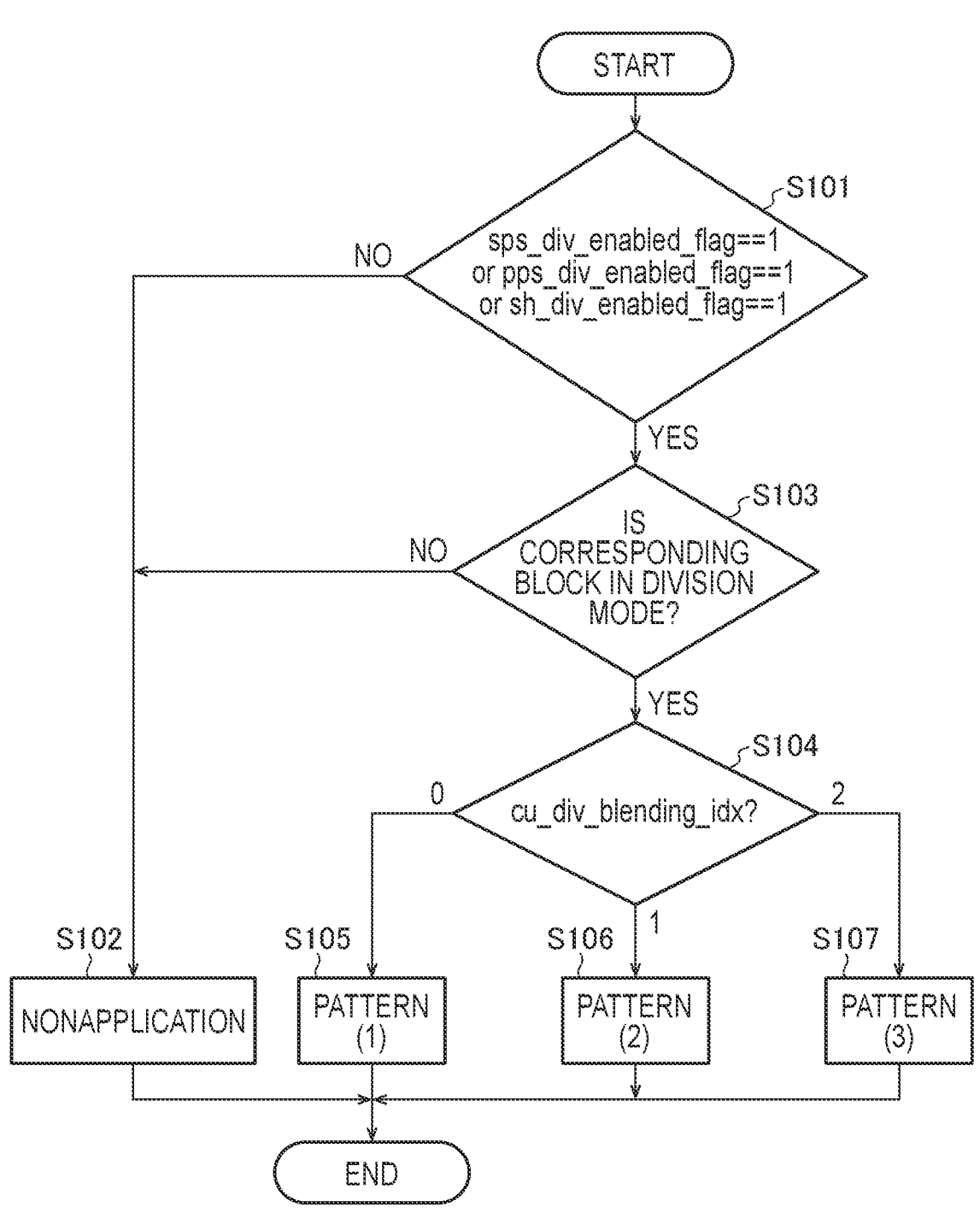
FIG. 8 is a flowchart illustrating an example of processing of setting weighting coefficients by a blending unit 207 according to a first embodiment.

As illustrated in FIG. 8, in step S101, the blending unit 207 determines whether or not any of sps_div_enabled_flag, pps_div_enabled_flag, and sh_div_enabled_flag included in the control information is 1. In a case of No (in a case where none of the flags is 1), the processing proceeds to step S102, and in a case of Yes, the processing proceeds to step S103.

In step S102, the blending unit 207 does not apply weighted averaging using the weighting coefficients to the decoding target block.

In step S103, the blending unit 207 determines whether or not GPM is applied to the decoding target block. In a case of No, the processing proceeds to step S102, and in a case of Yes, the processing proceeds to step S104.

In step S104, the blending unit 207 decodes cu_div_blending_idx included in the control information.

In a case where cu_div_blending_idx is 0, the operation proceeds to step S105. In a case where cu_div_blending_idx is 1, the operation proceeds to step S106. In a case where cu_div_blending_idx is 2, the operation proceeds to step S107.

In step S105, the blending unit 207 selects and applies, as the weighting coefficients, the weighting coefficients of the pattern (1) from among the patterns (1) to (3).

In step S106, the blending unit 207 selects and applies, as the weighting coefficients, the weighting coefficients of the pattern (2) from among the patterns (1) to (3).

In step S107, the blending unit 207 selects and applies, as the weighting coefficients, the weighting coefficients of the pattern (3) from among the patterns (1) to (3).

FIG. 8 illustrates an example in which the blending unit 207 decodes one cu_div_blending_idx in a case where the pattern of the divided boundary width is symmetric (a=b), but the blending unit 207 may decode two of cu_div_blending_idx0 and cu_div_blending_idx1 in a case where the pattern of the divided boundary width is asymmetric (a≠b).

Here, cu_div_blending_idx is decoded so as to specify one of div_blending_list in the lowest layer applied to the block to be decoded.

Thus, in a case where div_num_blending_list in the lowest layer applied to the block to be decoded is 1, the decoding of cu_div_blending_idx can be omitted, and encoding efficiency can be improved by estimating cu_div_blending_idx as 0.

In a case where div_num_blending_list in the lowest layer applied to the block to be decoded is larger than 1, cu_div_blending_idx may be decoded with a fixed length, or cu_div_blending_idx may be decoded with a variable length. In a case where cu_div_blending_idx is decoded with a variable length, a value of cu_div_blending_idx may be allocated in the descending order of selectivity.

Note that, in a case where the chroma component of the block to be decoded is not downsampled with respect to the luminance component of the block to be decoded, the blending unit 207 may derive a weighting factor that determines the divided boundary width of the chroma component of the block to be decoded without using control information for deriving a weighting factor that determines the divided boundary width of the luminance component of the block to be decoded (that is, using instead control information for deriving a weighting factor that determines the divided boundary width of the chroma component of the block to be decoded). According to such a configuration, since the weighting factor of the chroma component of the block to be decoded can be independently derived, an effect of improving encoding performance can be expected.

On the other hand, in a case where the chroma component of the block to be decoded is downsampled with respect to the luminance component of the block to be decoded, the blending unit 207 may derive a weighting factor that determines the divided boundary width of the chroma component of the block to be decoded using control information for deriving a weighting factor that determines the divided boundary width of the luminance component of the block to be decoded (that is, without using control information for deriving a weighting factor that determines the divided boundary width of the chroma component of the block to be decoded).

According to such a configuration, the same effect as that obtained for the luminance component can also be obtained for the chroma component downsampled. Further, in a case where control information such as a header is used to determine the divided boundary width of the luminance component of the block to be decoded, such control information is unnecessary for the chroma component, so that an effect of improving encoding performance can be expected.

Second Embodiment

Hereinafter, with reference to FIG. 3 and FIG. 9 to FIG. 11, a second embodiment of the present invention will be described focusing on differences from the first embodiment.

In the present embodiment, a code length is reduced by specifying a pattern of the weighting coefficients while eliminating a need for direct control information.

Therefore, in the present embodiment, the blending unit 207 is configured to generate the third predicted sample for at least one of the first predicted sample and the second predicted sample by weighted averaging using weighting coefficients which are uniquely selected from among the plurality of weighting coefficients based on the indirect control information.

That is, in the present embodiment, the blending unit 207 is configured to select (uniquely specify) the weighting coefficients from among the plurality of weighting coefficients according to the indirect control information.

Here, the blending unit 207 may be configured to prepare a plurality of weighting coefficients by which a width of the division boundary of the small areas is different and select the weighting coefficients from among the plurality of weighting coefficients.

Specifically, the blending unit 207 may be configured to select the weighting coefficients from among the plurality of weighting coefficients according to the shape of the decoding target block that is indirect control information.

For example, the blending unit 207 may be configured to select the weighting coefficients from among the plurality of weighting coefficients according to at least one of a short side of the decoding target block, a long side of the decoding target block, an aspect ratio of the decoding target block, a division mode, and the number of samples of the decoding target block.

For example, in a case where the short side of the decoding target block is used as the shape of the decoding target block, when the short side of the decoding target block is short, if weighted averaging is performed over a wide area, it is not different from simple bidirectional prediction. Therefore, it is desirable to exclude weighting coefficients of a pattern in which the width of the division boundary is wide from options.

For example, in the example of FIG. 3, the blending unit 207 selects the weighting coefficients of the pattern (3) in a case where the short side of the decoding target block is equal to or shorter than a threshold value, and selects the weighting coefficients of the pattern (2) in a case where the short side of the decoding target block is longer than the threshold value. Thus, it is possible to obtain an effect of increasing the number of patterns, eliminating a need for the control information of the pattern, and improving encoding efficiency.

Hereinafter, an example of processing of setting the weighting coefficients by the blending unit 207 will be described with reference to FIG. 9.

Figure 9:
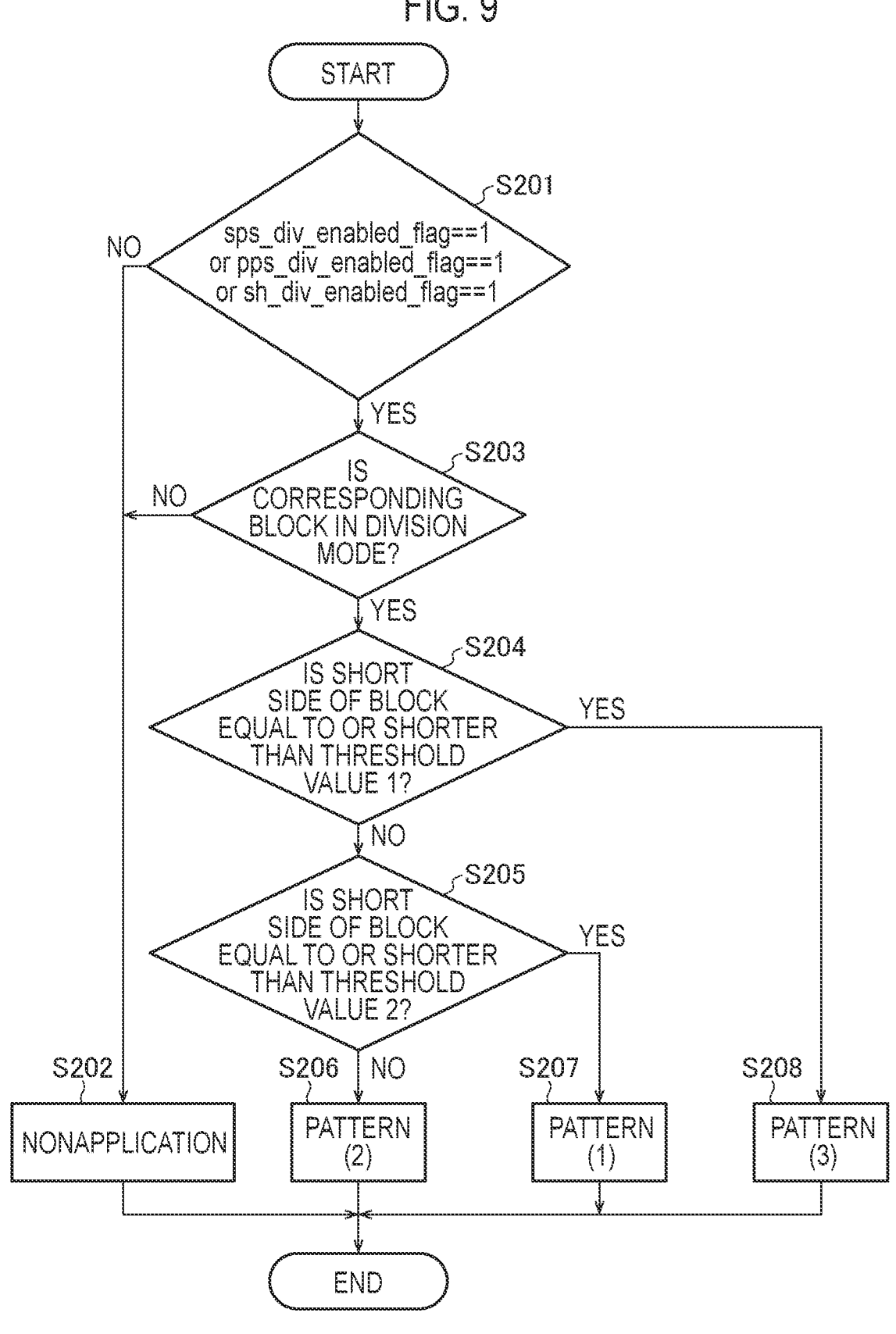
FIG. 9 is a flowchart illustrating an example of processing of setting weighting coefficients by the blending unit 207 according to a second embodiment.

As illustrated in FIG. 9, in step S201, the blending unit 207 determines whether or not any of sps_div_enabled_flag, pps_div_enabled_flag, and sh_div_enabled_flag included in the control information is 1. In a case of No (in a case where none of the flags is 1), the processing proceeds to step S202, and in a case of Yes, the processing proceeds to step S203.

In step S202, the blending unit 207 does not apply weighted averaging using the weighting coefficients to the decoding target block.

In step S203, the blending unit 207 determines whether or not GPM is applied to the decoding target block. In a case of No, the processing proceeds to step S202, and in a case of Yes, the processing proceeds to step S204.

In step S204, the blending unit 207 determines whether or not the short side of the decoding target block is equal to or shorter than a threshold value 1 that is set in advance. In a case of No, the processing proceeds to step S205, and in a case of Yes, the processing proceeds to step S208.

In step S205, the blending unit 207 determines whether or not the short side of the decoding target block is equal to or shorter than a threshold value 2 that is set in advance. Here, the threshold value 2 is larger than the threshold value 1. In a case of No, the processing proceeds to step S206, and in a case of Yes, the processing proceeds to step S207.

In step S206, the blending unit 207 selects and applies, as the weighting coefficients, the weighting coefficients of the pattern (2) from among the patterns (1) to (3).

In step S207, the blending unit 207 selects and applies, as the weighting coefficients, the weighting coefficients of the pattern (1) from among the patterns (1) to (3).

In step S208, the blending unit 207 selects and applies, as the weighting coefficients, the weighting coefficients of the pattern (3) from among the patterns (1) to (3).

Similarly, in a case where the long side of the decoding target block, the aspect ratio of the decoding target block, the division mode, the number of samples of the decoding target block, and the like are used as the shape of the decoding target block, if weighted averaging is performed over a wide area, it is not different from simple bidirectional prediction. Therefore, it is desirable to exclude weighting coefficients of a pattern in which the width of the division boundary is wide from the options.

That is, in step S204 and step S205 of the flowchart illustrated in FIG. 9, the short side of the decoding target block may be replaced with the long side of the decoding target block, the aspect ratio of the decoding target block, the division mode, or the number of samples of the decoding target block.

Further, in the flowchart illustrated in FIG. 9, in step S204, the blending unit 207 may determine whether or not the short side of the decoding target block is shorter than the threshold value 1 which is set in advance, and in step S205, the blending unit 207 may determine whether or not the short side of the decoding target block is shorter than the threshold value 2 which is set in advance.

Here, as the modified example, the short side of the decoding target block, the aspect ratio of the block, and the division mode (an angle of the division boundary) may be used as the shape of the decoding target block.

For example, in a case where the short side of the decoding target block is short, the aspect ratio of the block is large (height:width=4:1 or the like), and the angle of the division boundary is equal to or larger than 45 degrees, weighting coefficients of a pattern in which the width of the division boundary is wide may be excluded from the options.

Conversely, in a case where the short side of the decoding target block is short, the aspect ratio of the block is large (height:width=4:1 or the like), and the angle of the division boundary is smaller than 45 degrees, weighting coefficients of a pattern in which the width of the division boundary is narrow may be excluded from the options.

Thereby, it is possible to select the width of the division boundary in consideration of the shape of the block, and improvement in encoding performance can be expected.

Further, the blending unit 207 may be configured to select the weighting coefficients according to a motion vector.

Specifically, the blending unit 207 may be configured to use a motion vector of the small area and select the weighting coefficients according to a length of the motion vector of the small area or resolution of the motion vector of the small area.

As the motion vector is larger, the division boundary becomes more blurred. Therefore, it is desirable to widen the distribution of the weighting coefficients. Similarly, as the resolution of the motion vector is lower, the division boundary becomes more blurred. Therefore, it is desirable to widen the distribution of the weighting coefficients.

Further, the blending unit 207 may be configured to select the weighting coefficients according to a difference between the motion vectors of the small area A and the small area B.

Here, the difference between the motion vectors is a difference between reference frames of the motion vectors of the small area A and the small area B or an amount of a difference between the motion vectors themselves.

For example, the blending unit 207 may be configured to select the weighting coefficients so as to narrow the distribution of the weighting coefficients in a case where the difference between the motion vectors of the small area A and the small area B is equal to or larger than a predetermined threshold value (for example, one sample), and select the weighting coefficients so as to widen the distribution of the weighting coefficients in a case where the difference between the motion vectors of the small area A and the small area B is smaller than the predetermined threshold value (for example, one sample).

According to the configuration, it is possible to perform prediction with high accuracy in accordance with an edge of an image (a boundary between a background and a foreground having different movements, or the like) that may occur near the division boundary.

Alternatively, the blending unit 207 may be configured to select the weighting coefficients so as to widen the distribution of the weighting coefficients in a case where the difference between the motion vectors of the small area A and the small area B is equal to or larger than a predetermined threshold value (for example, one sample), and select the weighting coefficients so as to narrow the distribution of the weighting coefficients in a case where the difference between the motion vectors of the small area A and the small area B is smaller than the predetermined threshold value (for example, one sample).

According to the configuration, it is possible to perform prediction with high accuracy in accordance with a size of a motion blur in the vicinity of the division boundary.

Here, the blending unit 207 may be configured to select selectable weighting coefficients according to an angle relationship between the motion vector and the division boundary.

Figure 10:
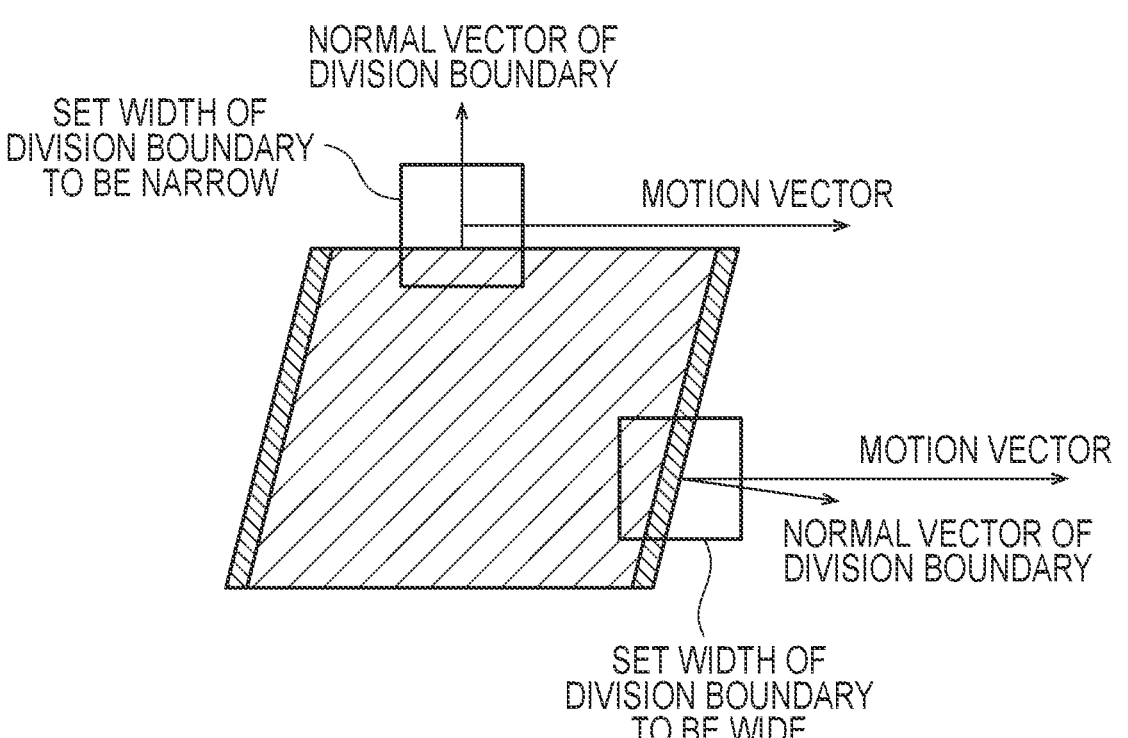
FIG. 10 is a diagram for explaining the second embodiment.

For example, as illustrated in FIG. 10, the blending unit 207 may be configured to select the weighting coefficients according to an absolute value |x×u+y×v| of the inner product of the motion vector (x, y) and the unit normal vector (u, v) of the division boundary.

Alternatively, the blending unit 207 may be configured to select selectable weighting coefficients according to an exposure time or a frame rate.

Further, the blending unit 207 may be configured to select selectable weighting coefficients according to a method of predicting the small area.

Further, the blending unit 207 may be configured to select selectable weighting coefficients according to a quantized parameter.

Further, the blending unit 207 may be configured to select the weighting coefficients of the decoding target block according to not only the control information of the decoding target block but also control information of a block near the decoding target block.

For example, the small area tends to be continuous across a plurality of blocks. Thus, the blending unit 207 may be configured to select the weighting coefficients of the decoding target block according to weighting coefficients of an adjacent decoded block.

Figure 11:
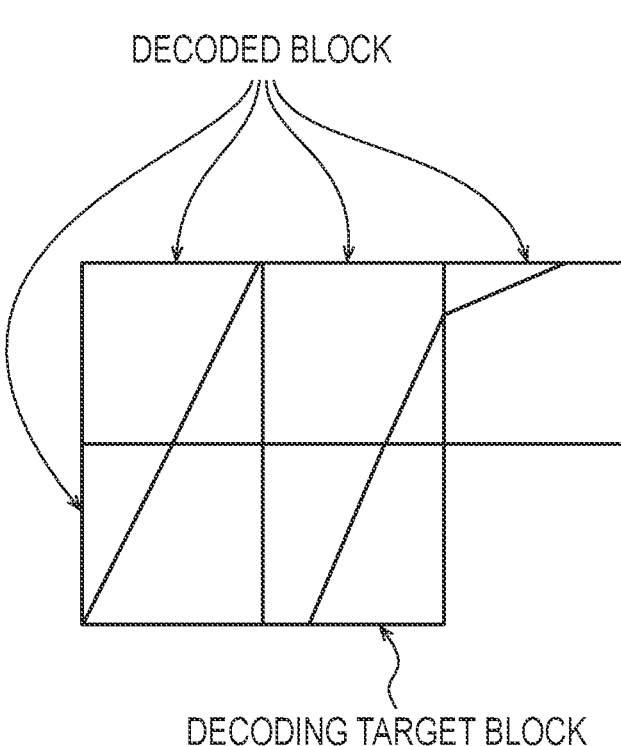
FIG. 11 is a diagram for explaining the second embodiment.

FIG. 11 is a diagram illustrating an example of left, upper left, upper, and upper right blocks adjacent to the decoding target block.

The division boundary also exists in the left and upper left blocks adjacent to the decoding target block, but is not continuous with the division boundary of the decoding target block. Therefore, the blending unit 207 does not select the noncontinuous division boundary, and can select, as the decoding target block, a width of the division boundary of the upper block of the decoding target block that has a continuous division boundary.

Similarly, the blending unit 207 may be configured to derive a pattern of weight coefficients of a block near the decoding target block, as an internal parameter corresponding to a merge index used when decoding the merge vector of each small area, and select the weight coefficients as the weight coefficients of each small area of the decoding target block.

The blending unit 207 may be configured to select the width of the division boundary of the pattern which is set in advance (for example, pattern (1)) as the small area of the decoding target block in a case where the merge vector corresponding to each small area does not exist.

Here, in a case where each small area is in the intra prediction mode, the blending unit 207 may be configured to select the width of the division boundary of the pattern which is set in advance (for example, pattern (1)) as the small area of the decoding target block.

Third Embodiment

Hereinafter, with reference to FIG. 3 and FIG. 8 to FIG. 12, a third embodiment of the present invention will be described focusing on differences from the first embodiment and the second embodiment.

In the present embodiment, the blending unit 207 is configured to generate the third predicted sample for at least one of the first predicted sample and the second predicted sample by weighted averaging using any one of the weighting coefficients limited based on the decoded control information.

That is, the blending unit 207 is configured to limit combinations of the selectable weighting coefficients according to the indirect control information and select the weighting coefficients to be applied based on the decoded control information from the limited combinations of the weighting coefficients.

Here, the blending unit 207 may be configured to prepare a plurality of weighting coefficients by which a width of the division boundary of the small areas is different and select the weighting coefficients.

The blending unit 207 may be configured to limit combinations of selectable weighting coefficients according to the shape of the decoding target block that is indirect control information.

For example, the blending unit 207 may be configured to limit the selectable weighting coefficients according to at least one of a size of the decoding target block (a short side of the decoding target block, a long side of the decoding target block, or the like), an aspect ratio of the decoding target block, a division mode, and the number of samples of the decoding target block.

Here, in a case where the short side of the decoding target block is used as the shape of the decoding target block, when the short side of the decoding target block is short, if weighted averaging is performed over a wide area, it is not different from simple bidirectional prediction. Therefore, it is desirable to exclude weighting coefficients of a pattern in which the width of the division boundary is wide from options (combinations of the selectable weighting coefficients).

For example, in the example of FIG. 3, the blending unit 207 limits combinations of the selectable weighting coefficients to the weighting coefficients of the pattern (1) or (3) in a case where the short side of the decoding target block is equal to or shorter than a threshold value, and limits combinations of the selectable weighting coefficients to the weighting coefficients of the pattern (1) or (2) in a case where the short side of the decoding target block is longer than the threshold value. Thus, it is possible to obtain an effect of increasing the number of patterns, reducing an encoding amount of the control information of the pattern, and improving encoding efficiency.

Here, for example, 8 samples or 16 samples may be set as the threshold value of the short side of the decoding target block.

Hereinafter, an example of processing of setting the weighting coefficients by the blending unit 207 will be described with reference to FIG. 12.

Figure 12:
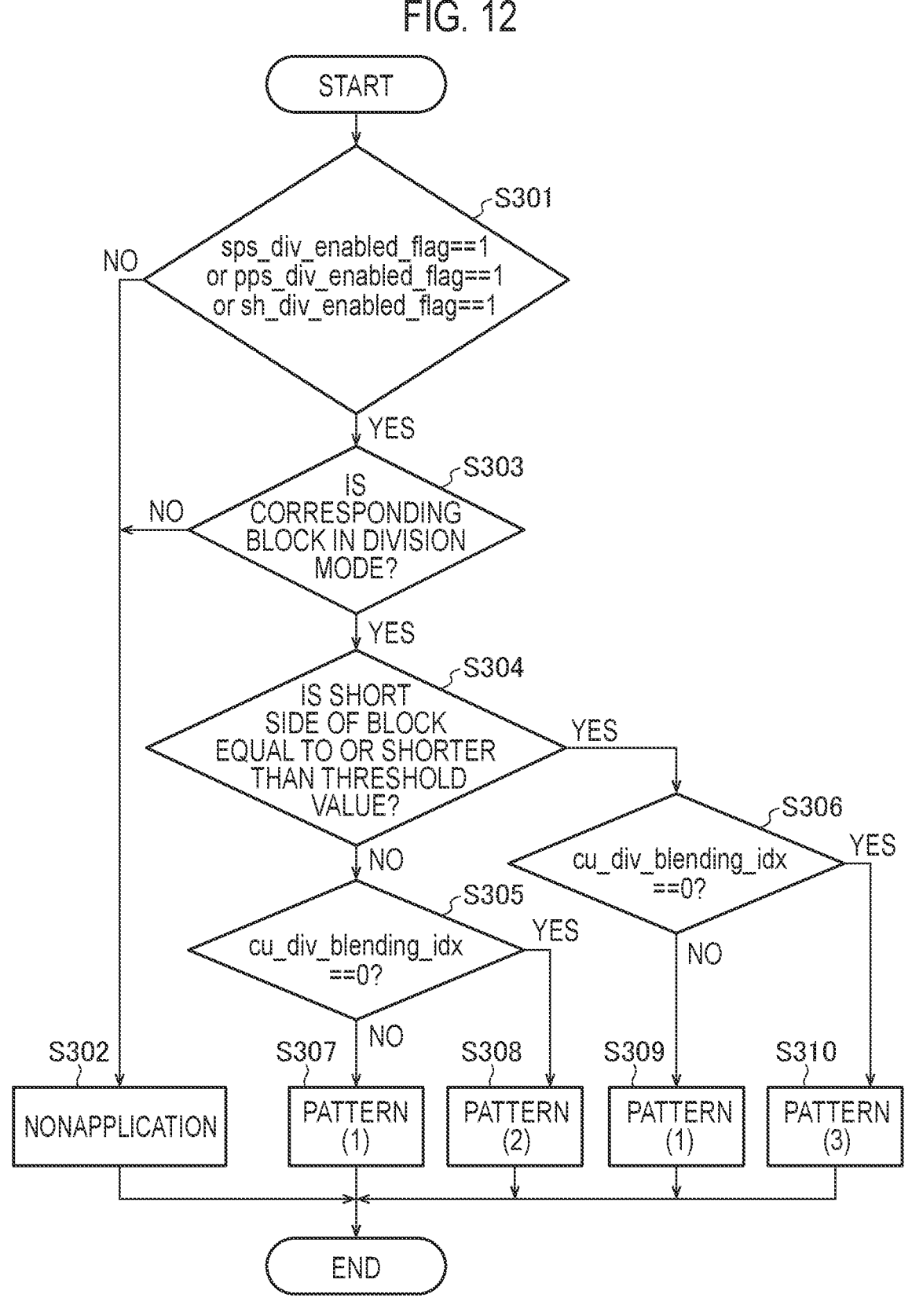
FIG. 12 is a flowchart for explaining an example of processing of setting weighting coefficients by the blending unit 207 according to a third embodiment.

As illustrated in FIG. 12, in step S301, the blending unit 207 determines whether or not any of sps_div_enabled_flag, pps_div_enabled_flag, and sh_div_enabled_flag included in the control information is 1. In a case of No (in a case where none of the flags is 1), the processing proceeds to step S302, and in a case of Yes, the processing proceeds to step S303.

In step S302, the blending unit 207 does not apply weighted averaging using the weighting coefficients to the decoding target block.

In step S303, the blending unit 207 determines whether or not GPM is applied to the decoding target block. In a case of No, the processing proceeds to step S302, and in a case of Yes, the processing proceeds to step S304.

In step S304, the blending unit 207 determines whether or not the short side of the decoding target block is equal to or shorter than a threshold value that is set in advance.

In a case of No, the processing proceeds to step S305, and in a case of Yes, the processing proceeds to step S306. Here, in a case of No, the blending unit 207 limits combinations of the selectable weight coefficients to the pattern (1) or (2), and in a case of Yes, the blending unit 207 limits combinations of the selectable weight coefficients to the pattern (1) or (3).

In step S305, the blending unit 207 decodes cu_div_blending_idx (direct control information) included in the control information.

In a case where cu_div_blending_idx is not 0, the present operation proceeds to step S307, and in a case where cu_div_blending_idx is 0, the present operation proceeds to step S308.

Similarly, in step S306, in a case where cu_div_blending_idx is not 0, the present operation proceeds to step S309, and in a case where cu_div_blending_idx is 0, the present operation proceeds to step S310.

In step S307, the blending unit 207 selects and applies, as the weighting coefficients, the weighting coefficients of the pattern (1) from the pattern (1) or (2).

In step S308, the blending unit 207 selects and applies, as the weighting coefficients, the weighting coefficients of the pattern (2) from the pattern (1) or (2).

In step S309, the blending unit 207 selects and applies, as the weighting coefficients, the weighting coefficients of the pattern (1) from the pattern (1) or (3).

In step S310, the blending unit 207 selects and applies, as the weighting coefficients, the weighting coefficients of the pattern (3) from the pattern (1) or (3).

As described above, in a case where the short side of the block to be decoded as the indirect control information is equal to or less than the threshold value, the blending unit 207 limits the combination of selectable weighting factors to the weighting factor of the pattern (1)/(3) among the weighting factors of the patterns (1) to (3), and makes a determination for cu_div_blending_idx as the direct control information, thereby selecting the weighting factor of one pattern from the weighting factors of the limited patterns.

On the other hand, in a case where the short side of the block to be decoded is larger than the threshold value, the blending unit 207 limits the combination of selectable weighting factors to the weighting factor of the pattern (1)/(2) among the weighting factors of the patterns (1) to (3), and makes a determination for cu_div_blending_idx as the direct control information, thereby selecting the weighting factor of one pattern from the weighting factors of the limited patterns.

That is, in an example in which three types of weighting factors of the patterns (1) to (3) are stored in sps_div_blending_list described above, the blending unit 207 can limit the combinations of weighting factors of patterns selectable in cu_div_blending_idx to two types by the indirect control information.

In a case where the short side of the block to be decoded is equal to or less than the threshold value, the blending unit 207 selects the weighting factor of the pattern (2) when cu_div_blending_idx is 0, and selects the weighting factor of the pattern (1) when cu_div_blending_idx is 1.

On the other hand, in a case where the short side of the block to be decoded is larger than the threshold value, the blending unit 207 selects the weighting factor of the pattern (3) when cu_div_blending_idx is 0, and selects the weighting factor of the pattern (1) when cu_div_blending_idx is 1.

According to the above configuration, even in a case where the same cu_div_blending_idx is 0, an effect of improving encoding efficiency can be obtained by controlling the pattern of the weighting factor to be selected according to another control signal.

Similarly, in a case where the long side of the decoding target block, the aspect ratio of the decoding target block, the division mode, the number of samples of the decoding target block, and the like are used as the shape of the decoding target block, if weighted averaging is performed over a wide area, it is not different from simple bidirectional prediction. Therefore, it is desirable to exclude weighting coefficients of a pattern in which the width of the division boundary is wide from the options.

That is, in step S304 of the flowchart illustrated in FIG. 12, the short side of the decoding target block may be replaced with the long side of the decoding target block, the aspect ratio of the decoding target block, the division mode, or the number of samples of the decoding target block.

Further, in the flowchart illustrated in FIG. 12, in step S304, the blending unit 207 may determine whether or not the short side of the decoding target block is shorter than a threshold value that is set in advance.

Here, as the modified example, the short side of the decoding target block, the aspect ratio of the block, and the division mode (an angle of the division boundary) may be used as the shape of the decoding target block.

For example, in a case where the short side of the decoding target block is short, the aspect ratio of the block is large (height:width=4:1 or the like), and the angle of the division boundary is equal to or larger than 45 degrees, weighting coefficients of a pattern in which the width of the division boundary is wide may be excluded from the options.

Conversely, in a case where the short side of the decoding target block is short, the aspect ratio of the block is large (height:width=4:1 or the like), and the angle of the division boundary is smaller than 45 degrees, weighting coefficients of a pattern in which the width of the division boundary is narrow may be excluded from the options.

Thereby, it is possible to select the width of the division boundary in consideration of the shape of the block, and improvement in encoding performance can be expected.

Further, the blending unit 207 may be configured to limit combinations of the selectable weighting coefficients according to the motion vector.

Specifically, the blending unit 207 may be configured to use a motion vector of the small area and limit combinations of the selectable weighting coefficients according to a length of the motion vector of the small area or resolution of the motion vector of the small area.

As the motion vector is larger, the division boundary becomes more blurred. Therefore, it is desirable to widen the distribution of the weighting coefficients. Similarly, as the resolution of the motion vector is lower, the division boundary becomes more blurred. Therefore, it is desirable to widen the distribution of the weighting coefficients.

Further, the blending unit 207 may be configured to limit combinations of the selectable weighting coefficients according to a difference between the motion vectors of the small area A and the small area B.

Here, the difference between the motion vectors is a difference between reference frames of the motion vectors of the small area A and the small area B or an amount of a difference between the motion vectors themselves.

For example, the blending unit 207 may be configured to limit combinations of the selectable weighting coefficients so as to narrow the distribution of the weighting coefficients in a case where the difference between the motion vectors of the small area A and the small area B is equal to or larger than a predetermined threshold value (for example, one sample), and limit combinations of the selectable weighting coefficients so as to widen the distribution of the weighting coefficients in a case where the difference between the motion vectors of the small area A and the small area B is smaller than the predetermined threshold value (for example, one sample).

According to the configuration, it is possible to perform prediction with high accuracy in accordance with an edge of an image (a boundary between a background and a foreground having different movements, or the like) that may occur near the division boundary.

Alternatively, the blending unit 207 may be configured to limit combinations of the selectable weighting coefficients of the pattern so as to widen the distribution of the weighting coefficients in a case where the difference between the motion vectors of the small area A and the small area B is equal to or larger than a predetermined threshold value (for example, one sample), and limit combinations of the selectable weighting coefficients of the pattern so as to narrow the distribution of the weighting coefficients in a case where the difference between the motion vectors of the small area A and the small area B is smaller than the predetermined threshold value (for example, one sample).

According to the configuration, it is possible to perform prediction with high accuracy in accordance with a size of a motion blur in the vicinity of the division boundary.

Here, the blending unit 207 may be configured to limit combinations of the selectable weighting coefficients according to an angle relationship between the motion vector and the division boundary.

For example, as illustrated in FIG. 10, the blending unit 207 may be configured to limit combinations of the selectable weighting coefficients according to an absolute value $|x \times u + y \times v|$ of the inner product of the motion vector (x, y) and the unit normal vector (u, v) of the division boundary.

Alternatively, the blending unit 207 may be configured to limit a combination of the selectable weighting coefficients according to an exposure time or a frame rate.

Further, the blending unit 207 may be configured to limit combinations of the selectable weighting coefficients according to a method of predicting the small area.

Further, the blending unit 207 may be configured to limit combinations of the selectable weighting coefficients according to a quantized parameter.

Further, the blending unit 207 may be configured to limit combinations of the selectable weighting coefficients of the decoding target block according to not only the control information of the decoding target block but also control information of a block near the decoding target block.

For example, the small area tends to be continuous across a plurality of blocks. Thus, the blending unit 207 may be configured to limit combinations of the selectable weighting coefficients of the decoding target block according to weighting coefficients of an adjacent decoded block.

FIG. 11 is a diagram illustrating an example of left, upper left, upper, and upper right blocks adjacent to the decoding target block.

The division boundary also exists in the left and upper left blocks adjacent to the decoding target block, but is not continuous with the division boundary of the decoding target block. Thus, the noncontinuous division boundary is not included in combinations of the weighting coefficients of the decoding target block. Therefore, the blending unit 207 can include, in the combinations of the weighting coefficients of the decoding target block, a width of the division boundary of the upper block of the decoding target block that has a continuous division boundary.

Note that, when limiting the combinations of the selectable weight coefficients of the decoding target block, the blending unit 207 may be configured to limit the combinations in stages rather than limiting the choices to include or not include the combinations.

For example, the decoding unit 201 improves encoding efficiency by allocating different code lengths according to a selection probability of the weighting coefficients and decoding the block.

In the above example, the decoding unit 201 can set the pattern of the weight coefficients adopted by the adjacent decoded block as a short code length, and set the other pattern as a long code length.

Further, the image encoding device 100 and the image decoding device 200 may be realized as a program causing a computer to execute each function (each step).

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. An image decoding device comprising a circuit that controls decoding of a first syntax for controlling a boundary width of a division mode of a sequence to be decoded, wherein the circuit:

decodes a second syntax for controlling whether or not a change of the boundary width is possible, and controls, based on the second syntax, decoding a third syntax representing a pattern of the boundary width.

2. The image decoding device according to claim 1, wherein the circuit:

decodes the third syntax when a value of the second syntax is 1, and does not decode the third syntax when a value of the second syntax is not 1.

3. The image decoding device according to claim 1, wherein the circuit is capable of changing the pattern of the boundary width or the number of the boundary widths in a header for each unit of decoding.

4. The image decoding device according to claim 1, wherein the circuit omits decoding of the pattern of the boundary width when the pattern of the boundary width is set in advance.

5. The image decoding device according to claim 1, wherein when a value of the second syntax for controlling the number of patterns of the boundary width is larger than 1, the circuit decodes the third syntax for specifying the pattern of the boundary width and specifies the boundary width.

6. The image decoding device according to claim 1, wherein when a value of the second syntax for controlling the number of patterns of the boundary width is 1, the circuit does not decode the third syntax for specifying the pattern of the boundary width.

7. The image decoding device according to claim 1, wherein the circuit changes a value of the second syntax for controlling the pattern of the boundary width according to the third syntax.

8. The image decoding device according to claim 7, wherein the circuit uses at least one of a block size, a motion vector, an encoding mode, a division shape, and a quantization parameter as syntax for changing the value of the second syntax for controlling the pattern of the boundary width.

9. An image decoding method comprising:

controlling decoding of a first syntax for controlling a boundary width of a division mode of a sequence to be decoded, wherein the controlling comprises:

decoding a second syntax for controlling whether or not a change of the boundary width is possible, and controlling, based on the second syntax, decoding a third syntax representing a pattern of the boundary width.

10. A program stored on a non-transitory computer-readable medium for causing a computer to function as an image decoding device, wherein the image decoding device includes a circuit that controls decoding of a first syntax for controlling a boundary width of a division mode of a sequence to be decoded, wherein the circuit:

decodes a second syntax for controlling whether or not a change of the boundary width is possible, and controls, based on the second syntax, decoding a third syntax representing a pattern of the boundary width.

* * * * *